(12) United States Patent
Raisch

(10) Patent No.: US 7,234,004 B2
(45) Date of Patent: Jun. 19, 2007

(54) METHOD, APPARATUS AND PROGRAM PRODUCT FOR LOW LATENCY I/O ADAPTER QUEUING IN A COMPUTER SYSTEM

(75) Inventor: Christoph Raisch, Gerlingen (DE)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 11/001,392

(22) Filed: Dec. 1, 2004

(65) Prior Publication Data

US 2005/0138230 A1     Jun. 23, 2005

(30) Foreign Application Priority Data

Dec. 19, 2003   (DE) ................................ 031 04 834

(51) Int. Cl.
*G06F 3/00*      (2006.01)
*G06F 13/00*     (2006.01)

(52) U.S. Cl. ............................ 710/5; 710/33; 710/52; 710/310

(58) Field of Classification Search ................ 710/3–7, 710/22–29, 33–35, 52–57, 310; 370/412
See application file for complete search history.

(56) References Cited

U.S. PATENT DOCUMENTS

| | | | | |
|---|---|---|---|---|
| 5,727,218 A | * | 3/1998 | Hotchkin | 710/260 |
| 5,809,328 A | * | 9/1998 | Nogales et al. | 710/5 |
| 6,321,276 B1 | * | 11/2001 | Forin | 710/3 |
| 7,152,122 B2 | * | 12/2006 | Kagan et al. | 709/250 |
| 2002/0152327 A1 | * | 10/2002 | Kagan et al. | 709/250 |
| 2003/0065856 A1 | * | 4/2003 | Kagan et al. | 710/263 |

* cited by examiner

*Primary Examiner*—Christopher Shin
(74) *Attorney, Agent, or Firm*—John E. Campbell

(57) ABSTRACT

In a computer system, an I/O adapter comprises at least one I/O request mailbox for receiving I/O requests and data from a CPU. The mailbox is connected to at least one I/O request queue storage for storing a plurality of I/O requests and related data or main memory addresses received by the mailbox. A credit register is provided for storing the filling state of the queue storage. A connection network is designed and operated to transfer the contents of the credit register to the CPU for checking the filling state of the queue storage, to transfer an I/O request and related data to a queue of a selected request mailbox, and to activate a doorbell apparatus for signalling to the I/O adapter to process the I/O request including an access to the main memory by the I/O adapter if required.

20 Claims, 10 Drawing Sheets

METHOD, APPARATUS AND PROGRAM PRODUCT FOR LOW LATENCY I/O ADAPTER QUEUING IN A COMPUTER SYSTEM

FIELD OF THE INVENTION

The invention relates to a method and apparatus for operating an I/O adapter in a computer system comprising at least one central processing unit (CPU) and a main memory which are connected through a connect network to at least one I/O adapter.

BACKGROUND OF THE INVENTION

In data processing and communication systems input and output operations represent a substantial share of the workload to be performed. Such I/O operations are time consuming and interrupt the regular task processing in the central processing units. To relief the CPUs from I/O operations special processors are used, designated as I/O adapters, which are designed to support one or more I/O devices such as disk and tape storages, communication or network devices, printers, scanners, etc. Each I/O adapter is connected through a data channel or bus to the CPU and the main memory of a computer system. The data transfer between these elements have to be organized in a manner which minimizes the interventions in the data processing flow of the CPU and simultaneously provides an efficient execution of I/O commands including read and write accesses to the maim memory.

U.S. Pat. No. 5,983,292 discloses an I/O system including a processor complex having a CPU and a main memory and being connected by a bus to an I/O adapter which serves a number of I/O devices. The system comprises message queues in the main memory which are pointing to next available memory locations where the CPU may store messages which have to be transferred via the interconnecting bus to the I/O adapter. The I/O adapter have downstream and upstream tracking registers and a message processor for tracking the locations in the main memory from which messages have be transferred to the I/O adapter or to which messages have be transferred from the I/O adapter to the processor complex. By this system the efficiency of the message transfer between the processor complex and the I/O adapter can be improved since the use of message queues reduce the CPU time required to process I/O interrupts. On the other side, the known system requires a plurality of time consuming main memory accesses.

U.S. Pat. No. 5,548,735 discloses a system for asynchronously processing of I/O store instructions. This system avoids a strict synchronization of a CPU operations with the operations of I/O adapters. A program interface is used which decouples the synchronized instructions of the CPU from the operations of the I/O adapter to allow an asynchronous completion of the instructions by the I/O adapter. The I/O program interface includes an I/O store queue which contains information for identifying the I/O store instructions to be executed.

SUMMARY OF THE INVENTION

In a computer system comprising at least one central processing unit and an input/output adapter the queuing of I/O requests in the I/O adapter is improved. Simultaneously, the requirement of synchronization between the CPU and the I/O adapter is avoided.

The invention is preferably used a in computer system which comprises at least one CPU having a cache memory. A connection network connects the CPU to a main memory of large capacity containing program instructions and data, and to an I/O adapter. I/O requests are transferred from the CPU through the connection network to the I/O adapter which comprises doorbell apparatus controlled by the CPU to allow the I/O adapter an access to the main memory for reading or writing I/O instructions and data. According to the invention, as defined in the claims, the I/O adapter comprises at least one I/O request mailbox for receiving I/O requests and data from a CPU. The I/O request mailbox is connected to at least one I/O request queue storage for storing a plurality of I/O requests and related data or main memory addresses received by the mailbox. A credit register is provided for storing the filling state of the queue storage. The connection network is designed and operated to transfer the contents of the credit register to the CPU which checks the filling state of the queue, to transfer an I/O request and related data to a queue of a selected request mailbox, and to activate the doorbell apparatus for signalling to the I/O adapter to process the I/O request including an access to the main memory by the I/O adapter if required.

In accordance with the principles of the invention, each initiator of an I/O request contains in the I/O adapter its own set of resources comprising an I/O request mailbox and associated therewith a credit register and a doorbell register. The initiators of I/O requests may be independent of each other and unsynchronized with each other or with the I/O adapter. The initiators of I/O requests may be one CPU or a number of CPUs or a processing thread or task running on the at least one of said CPUs.

A method according to the invention, as defined in the claims, comprises the steps of:

a) containing in the I/O adapter at least one I/O request mailbox for receiving I/O requests and data from the CPU;

b) extending the I/O request mailbox by at least one I/O request queue storage for storing a plurality of I/O requests and related data received by the mailbox;

c) connecting a credit register to the I/O request queue storage for registering the filling states of the I/O request queue storage;

d) transferring the contents of the credit register to the CPU for enabling the CPU to check the filling state of the I/O request queue storage;

e) transferring an I/O request and related data to the I/O request mailbox for being stored in the I/O request queue storage connected to the mailbox; and f) activating the doorbell register for signalling to the I/O adapter to process the I/O request including an access to the main memory by the I/O adapter if required.

The invention permits that the initiators of I/O requests do not need to synchronize the I/O requests with the operation of the main memory but may perform the enqueueing of I/O requests in the I/O adapter independently of main memory access operations and thus avoids latency due to required or pending ain memory access operations during the enqueueing process.

BRIEF DESCRIPTION OF THE DRAWINGS

Embodiments of the invention are subsequently described with reference to drawings which show.

DETAILED DESCRIPTION OF PREFERRED EMBODIMENTS OF THE INVENTION

Figure 1:
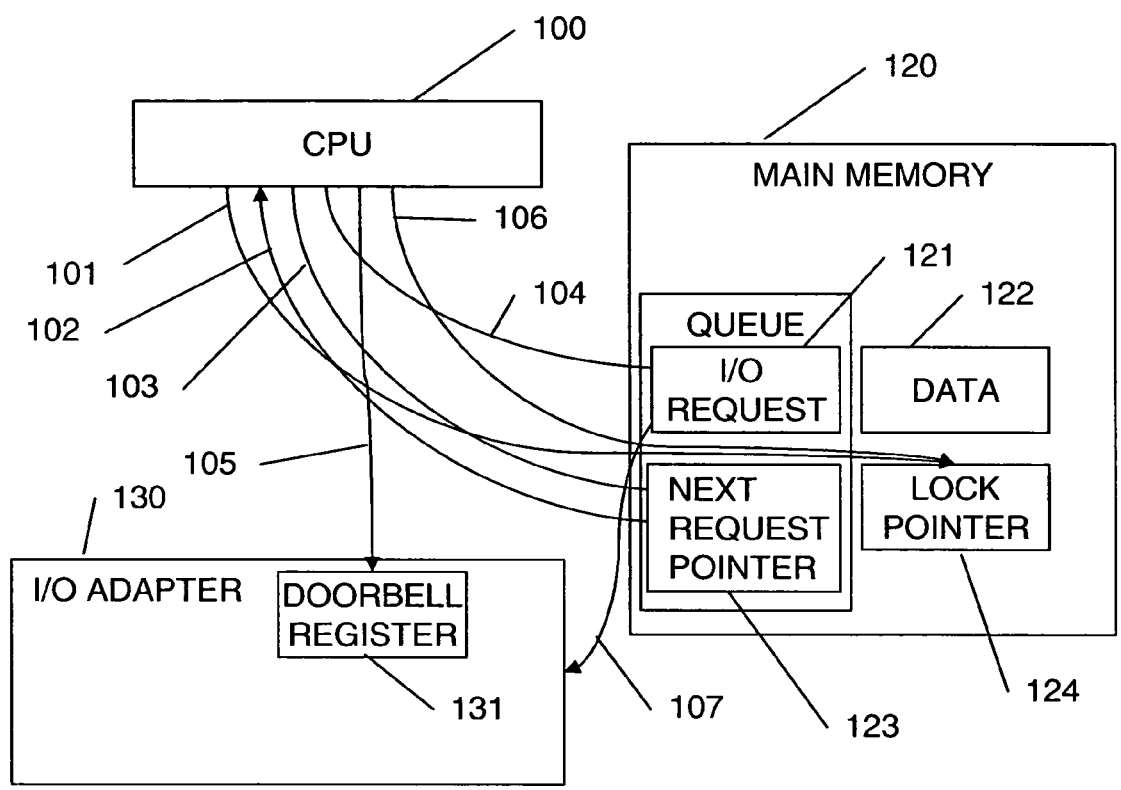
FIG. 1 a block diagram of a prior art computer system to describe the background of the invention.

FIG. 1 shows a schematic representation of a conventional computer system and its operation to execute I/O requests. This computer system comprises a central processing unit 100, a main memory 120 and I/O adapter 130. The I/O adapter and the central processing unit (CPU) share resources located in the main memory for enqueueing I/O requests to the adapter. FIG. 1 represents only a subsection of an I/O request queue maintained in the main memory. This subsection comprises a storage location 121 of an I/O request and a storage location 123 of the next request pointer address. A storage location 122 contains data to which the I/O request in storage location 121 is related, and a storage location 124 contains a lock pointer tag which is associated with the next request pointer address in location 123. The operation starts with step 101 setting the lock pointer tag in location 124 to secure that the data which are subject of the request are not modified by other main memory accesses. The CPU increments in step 102 the pointer in location 123 and in step 103 stores in this location the incremented pointer as next request pointer. In step 104 an I/O request is generated by the CPU and stored in location 121 addressed by the next request pointer in location 123. In the following step 105 the CPU activates a doorbell latch 131 in the I/O adapter 130 signalling to the I/O adapter that it may perform an access to the main memory for reading or writing I/O instructions and data. The CPU unlocks the next pointer in step 106 so that in step 107 the I/O adapter can fetch the I/O request from the main memory and read the data specified by the request from the main memory. A synchronization of the main memory accesses by the CPU and with main memory accesses by the I/O adapter is performed by synchronization instructions provided by the CPU. This has the result that the CPU has to wait for either main memory access or adapter resource access during the request enqueueing process. These types of latencies can aggregate to a relevant amount for low latency I/O requests or low latency clustering requests.

Figure 2:
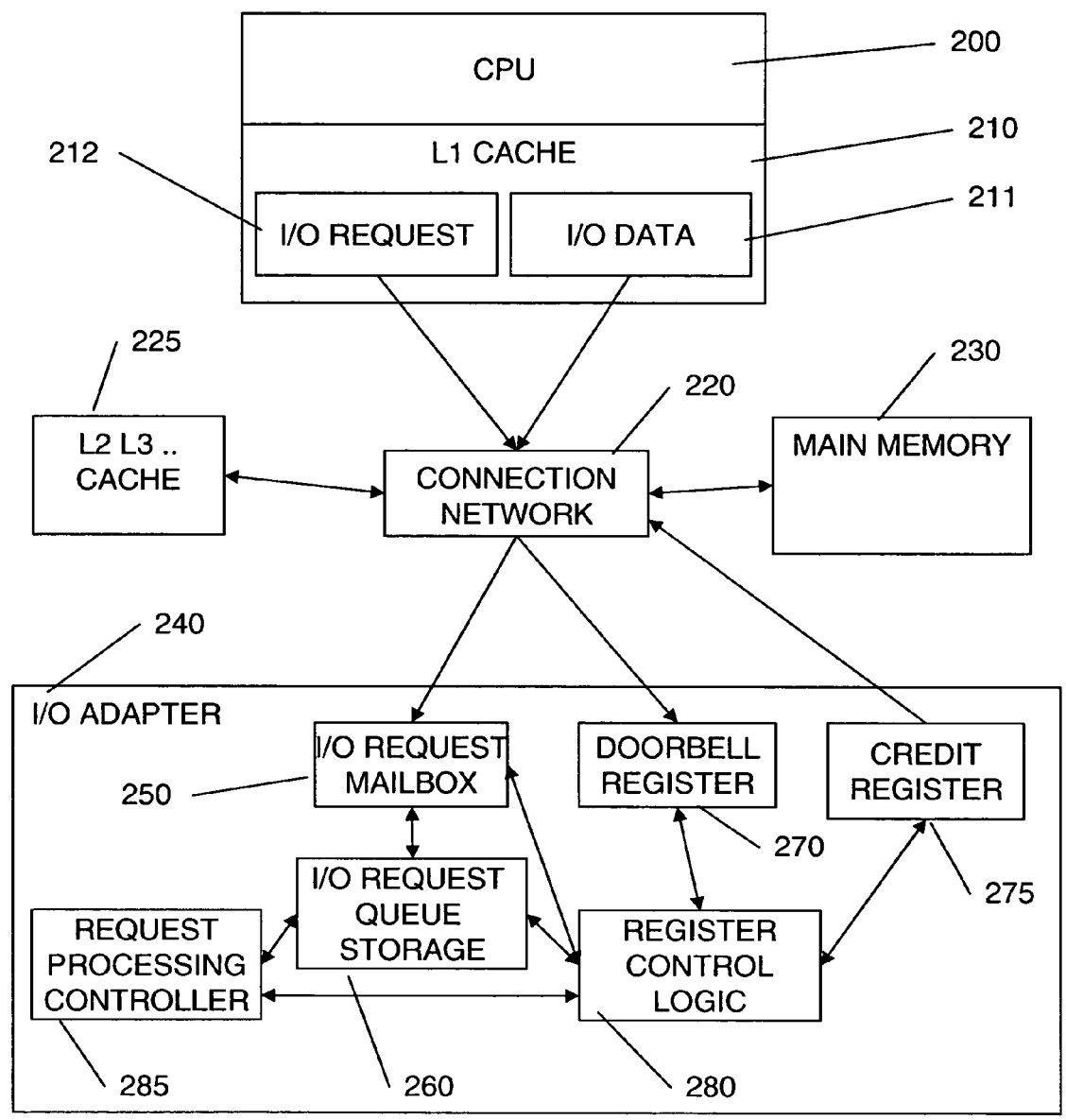
FIG. 2 a block diagram of a computer system comprising an embodiment of an apparatus according to the invention.

The FIG. 2 shows a computer system wherein the principles of the invention are implemented. The computer system comprises a CPU 200 which has a level 1 cache storage 210 with fast access time. The CPU 200 is connected through a connection network 220 to further caches which may be level 2 and 3 caches 225. The connection network 220 may be implemented as conventional data bus or by switches and point-to-point connections. The CPU 200 is also connected through network 220 to a main memory 230 which is usable for storing data and is typically implemented as DRAM. The CPU 200 is further connected through network 220 to an I/O adapter 240 which comprises at least one I/O request mailbox 250 and which is connected to at least one I/O request queue storage 260 to store I/O requests received by the mailbox 250 and the data associated with these I/O requests. The I/O request queue 260 is a local storage or a set of registers contained in the I/O adapter 240 and able to store a plurality of I/O requests and its associated data while waiting for execution.

The I/O adapter 240 comprises a doorbell register 270 which may be a register or a latch and which, if activated, signals to the I/O adapter 240 to process the I/O request including an access to the main memory by the I/O adapter if required. The I/O adapter 240 further comprises a credit register 275 which stores and indicates the filling state of the I/O request queue 260. A register control logic 280 is provided to maintain the contents of the credit register 275 according to the current filling state of the queue 260. This content of the credit register 275 is read by the CPU 200. The operation of the register control logic 280 is described in more detail with reference to FIG. 4. The execution of the I/O requests is controlled in a conventional manner by a process controller 285 the operation of which is described in with reference to FIG. 5.

Figure 3:
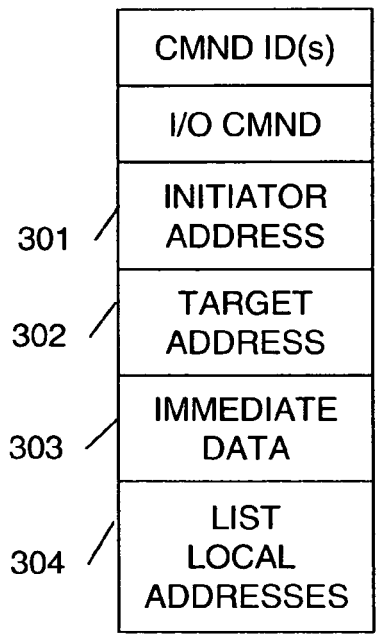
FIG. 3 a representation of the I/O request format as used in the computer system of FIG. 2.

An example of the format of an I/O request, herein also called "I/O command", is represented in FIG. 3. According to the format shown an I/O request comprises a command identification CMND ID which is used to identify a certain I/O request in the mailbox 250 and in the request queue storage 260 and to identify the response to this request generated by the I/O adapter. The I/O request further comprises a command code I/O CMND specifying the operation to be executed when interpreted by the I/O adapter. Furthermore, the request comprises an initiator address in a field 301 which in the system of FIG. 2 is the address of the CPU 200 but which may also be the address of multiple initiators of the request such as threads performed by CPU 200 or the address of a second CPU contained in the computer system. The field 301 may also contain a network initiator address such as an IP (Internet Protocol) initiator address. The request comprises further in a field 302 a target address of the request command and in a field 303 immediate data which are directly associated with the request. Finally, a field 304 of the request format comprises a list of addresses which are pointers to data associated with the request but are too large to be treated as immediate data. These pointers specify locations in the main memory where the data associated with the request are stored.

Figure 4:
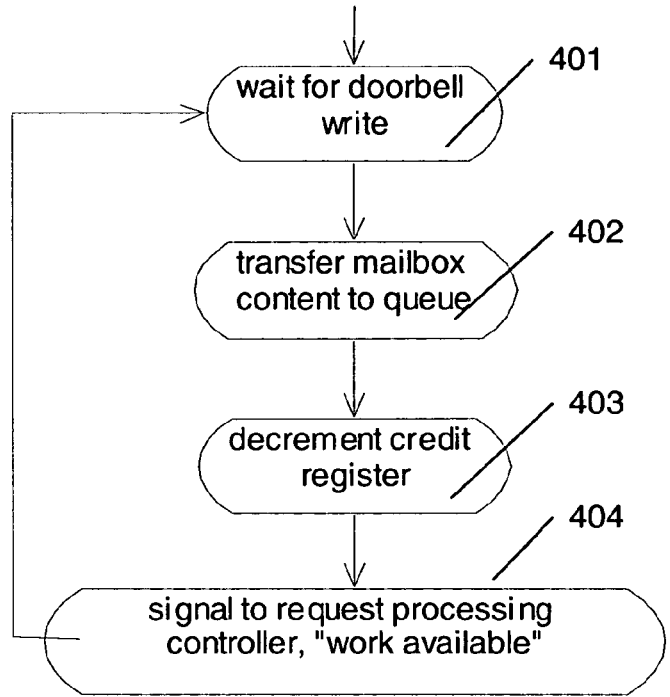
FIG. 4 a flow diagram representing the operation of the register control logic used in the I/O adapter of FIG. 2.

FIG. 4 shows the operation sequence of the control logic 280 to control the components 260, 270 and 275. Initially, the I/O adapter is in a reset status wherein the credit register 275 is set to indicate that the full capacity of the I/O request queue storage 260 is available if only one credit register exists 275, and is set to indicate that a fraction of the capacity of queue storage 260 is available if multiple credit registers exist. The initial status of the control logic 280, as shown at 401, is to wait for a command to activate the doorbell register 270 for signalling to the I/O adapter that the I/O request has to be executed wherein an access to the main memory by the I/O adapter may be performed if this is required. If such command is received, the control logic 280 transfers in step 402 an I/O request received by mailbox 250 to the next free location of the queue storage 260. In step 403 the control logic 280 decrements credit register 275 and sends in step 404 a signal to the request processing controller 285 indicating that work is available, i.e. that an I/O request has to be executed.

Figure 5:
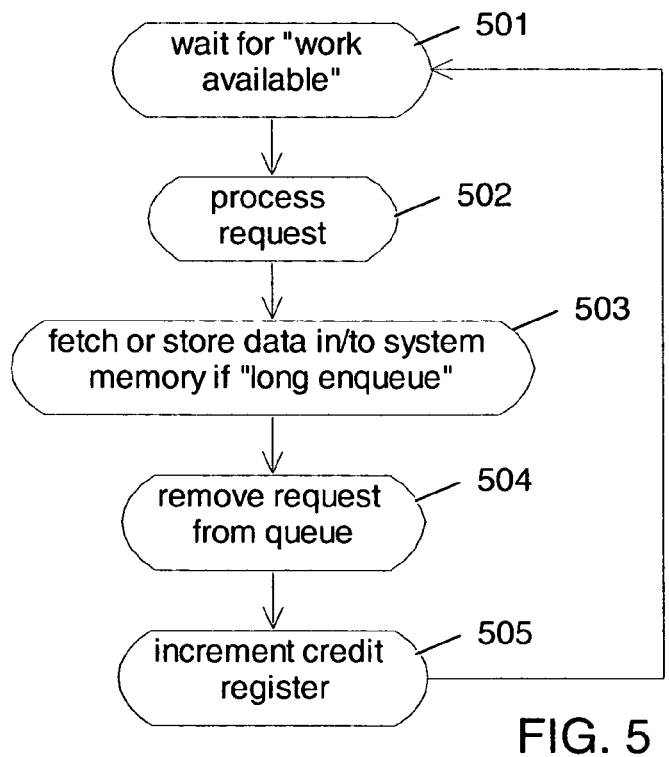
FIG. 5 a flow diagram representing the operation of the request processing controller used in the I/O adapter of FIG. 2.

The operation sequence of the controller 285 is shown in FIG. 5. The initial status of the 285 is the wait for "work available" status according to step 501. If the control logic 280 generates a "work available" signal, the controller 285 starts to process the I/O request in step 502. In case that the I/O request to be processed requires a long enqueue operation, step 503 performs an access to the main memory 230 to fetch or store data from or to the main memory 230. After the execution of the I/O request the controller 285 removes in step 504 the processed I/O request from the I/O request queue storage 260, and initiates in step 505 an increment of the credit register 275.

Figure 6:
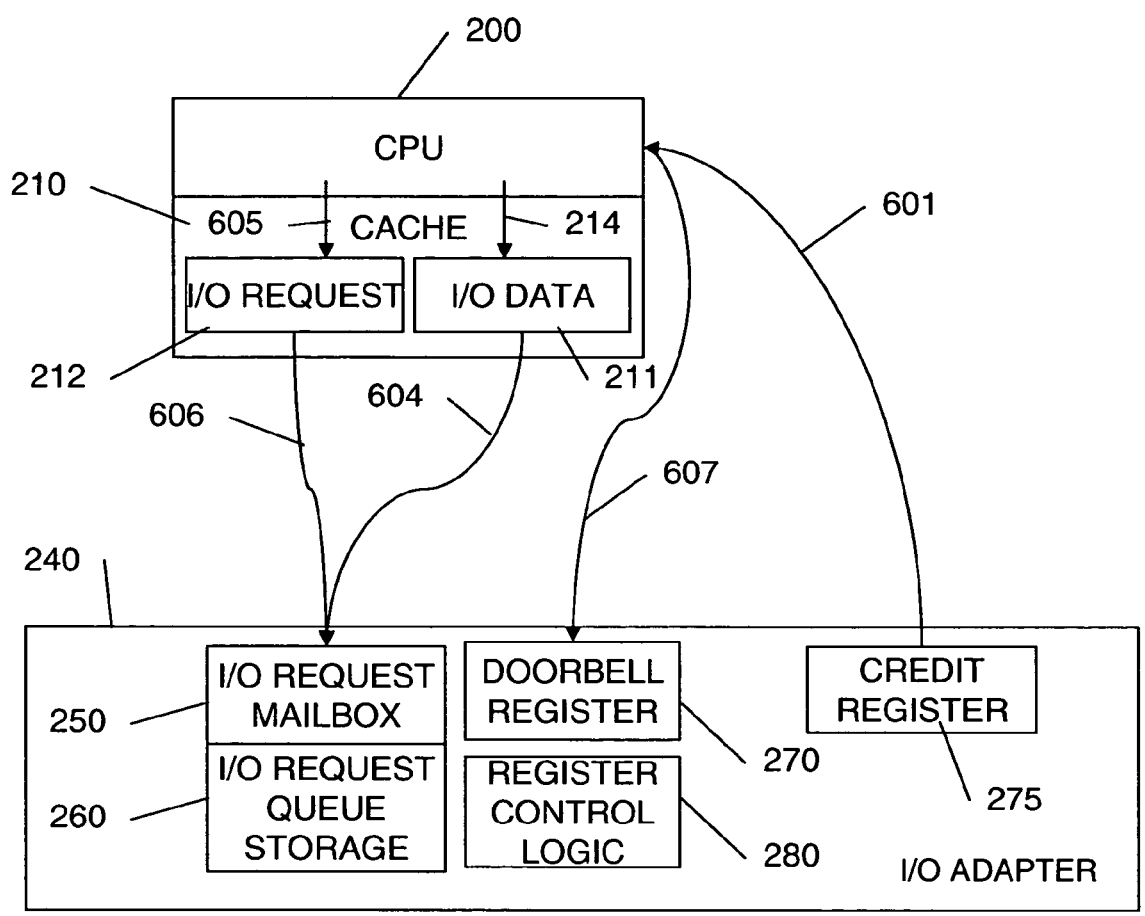
FIG. 6 a block diagram showing a fast enqueue operation of the apparatus according to FIG. 2.
Figure 7:
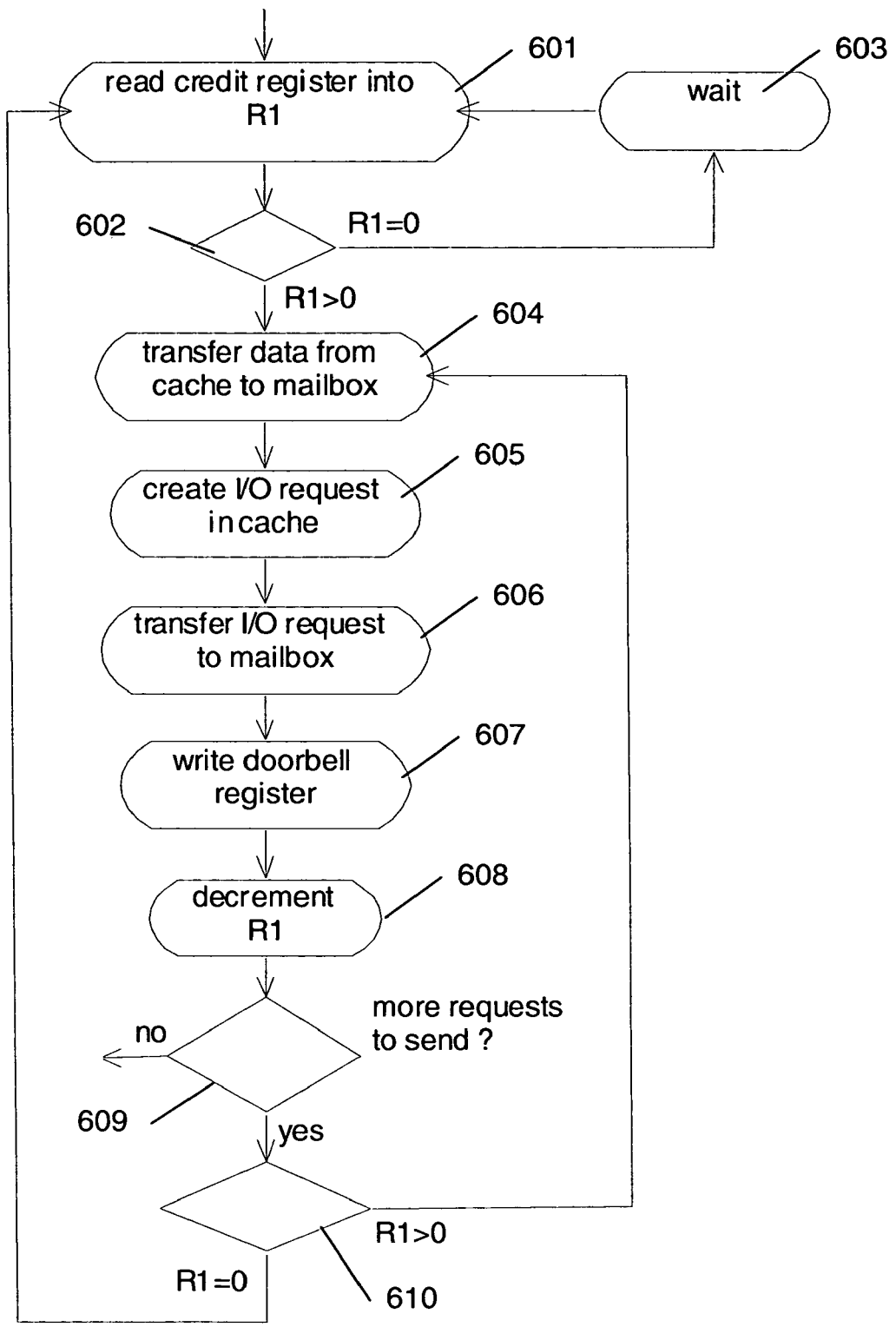
FIG. 7 a flow diagram representing method steps of the fast enqueue operation according to FIG. 6.

The method steps of the computer system for a fast enqueueing of I/O requests are described with reference to FIGS. 6 and 7. The CPU 200 starts the operation by step 601 to read the contents of the credit register 275 into a register R1 which is a register in the CPU 200 that is not shown. Alternatively, R1 may be a storage location in the cache 210. Step 602 checks register R1 whether its contents is zero. This is the case when the credit register indicates that the queue 260 is full. I such case a waiting status 603 is entered. If the register R1 contains a non-zero value, the CPU 200 performs a data transfer 214 to bring data which are subject of the next I/O request into a location 211 of cache 210. Subsequently, the CPU 200 creates in step 605 the next I/O request and stores it in location 212 of cache 210. In step 606 the I/O request in cache location 212 and the associated data in cache location 211 are transferred to the mailbox 250 from where they are shifted to the queue store 260 through step 402 (FIG. 4). In step 607 a command is written into the doorbell register 270 signalling to the I/O adapter that the I/O request is to be processed. Usually a transfer of an I/O request from the CPU to the mailbox 250 is followed by a doorbell activating signal. If sequences of I/O requests are created by the CPU 200 or another initiator, a doorbell activating signal may follow after each I/O request or after a predetermined number I/O requests. With the step 607 the operation of register control 280 is initiated. Step 608 decrements register R1 and step 609 checks whether there are more requests to be sent. If this is not the case, the fast enqueueing operation is terminated. Otherwise step 610 checks the content of register R1 and steps 604-610 are repeated except register R1 contains zero in which case step 601 is repeated.

Figure 8:
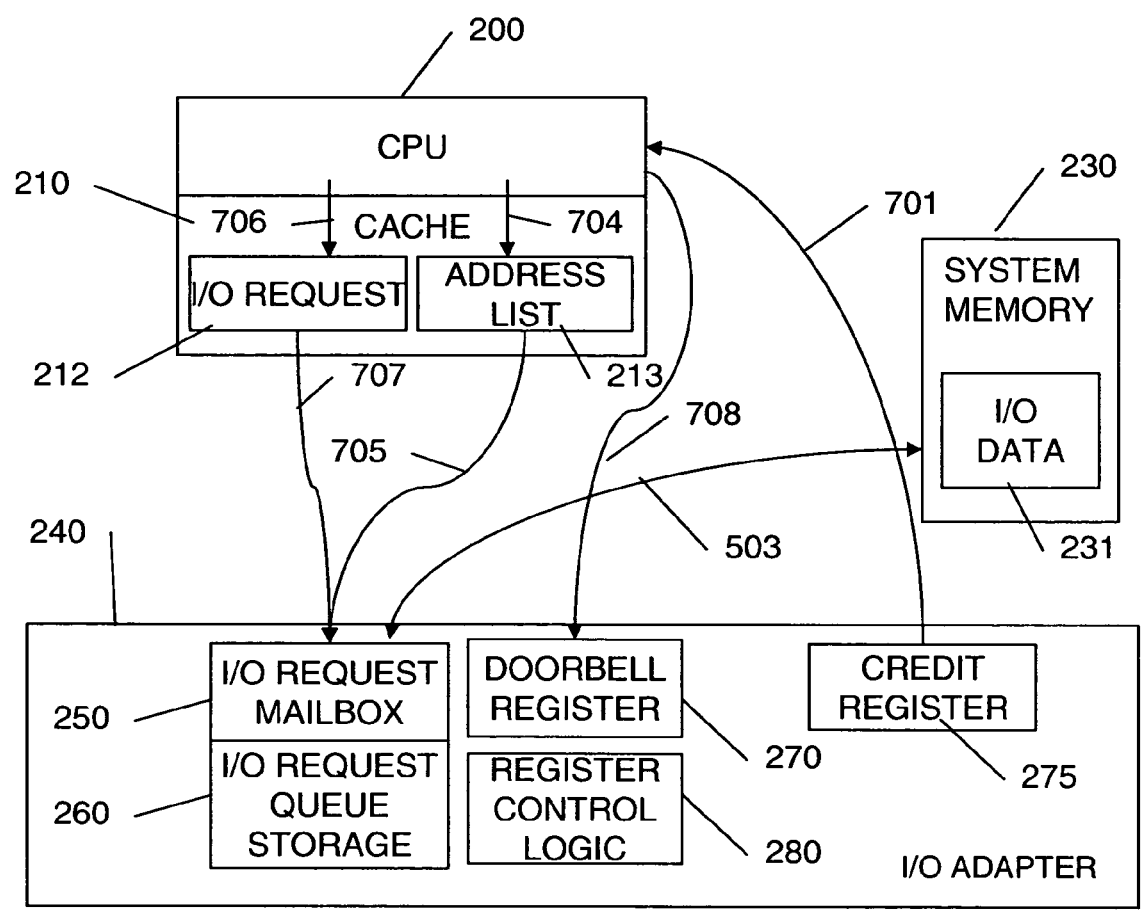
FIG. 8 a block diagram showing a long enqueue operation of the apparatus according to FIG. 2.
Figure 9:
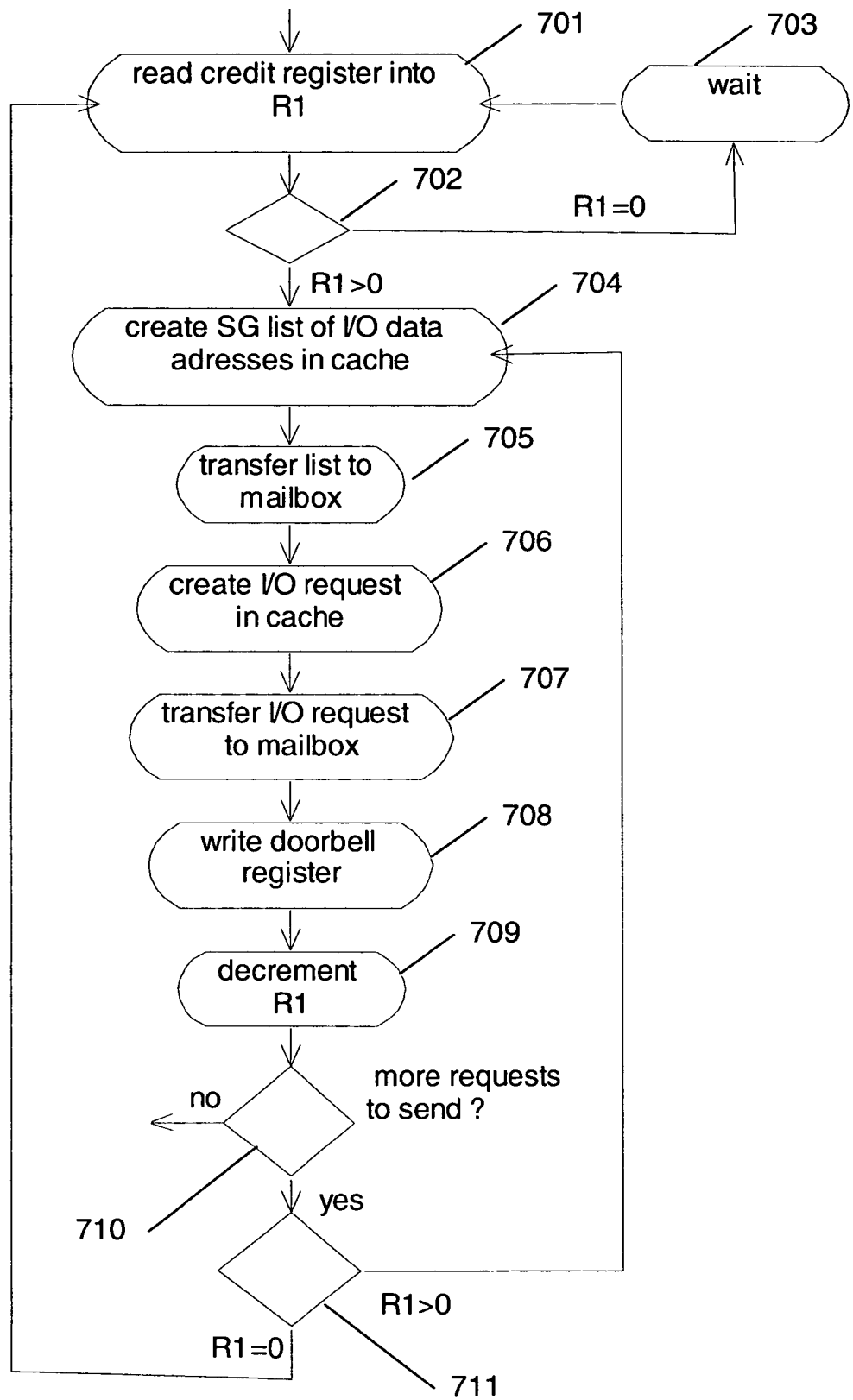
FIG. 9 a flow diagram representing method steps of the long enqueue operation according to FIG. 8.

FIGS. 8 and 9 show the method steps of the computer system for I/O requests having associated data which are too large for being stored in location 211 of cache 210 or are anyhow contained in the main memory. This operation is called "long enqueueing". The CPU 200 starts the operation by step 701 to read the contents of the credit register 275 into register R1 corresponding to step 601. Step 702 checks register R1 whether its contents is zero and waiting step 703 is entered if the credit register indicates that the queue 260 is full. In case of a non-zero value in register R1, the CPU 200 generates in location 213 of the cache 210 a pointer list to the I/O data which are subject of the next I/O request. This pointer list is generated by using the list of main memory addresses which are included in field 304 of the I/O request as shown in FIG. 4 and which addresses data associated with the request. Step 705 transfers the pointer list from the location 213 of the cache 210 to the mailbox 250. The CPU 200 creates in step 706 the next I/O request and stores it in location 212 of cache 210. In step 707 the I/O request in cache location 212 is transferred to the mailbox 250 from where it is transferred to the queue store 260 through step 402 in FIG. 5A. In step 708 a command is written into the doorbell register 270 for signalling to the I/O adapter that the I/O request has to be executed and that an access to the main memory 230 by the I/O adapter may be performed. With step 708 the operation of register control 280 is activated. Step 709 decrements register R1 and step 710 checks whether there are more requests to be sent. If this is not the case, the long enqueueing operation is terminated. Otherwise step 711 checks the content of register R1 and steps 704-711 are repeated except register R1 contains a zero value in which case step 701 is repeated.

Figure 10:
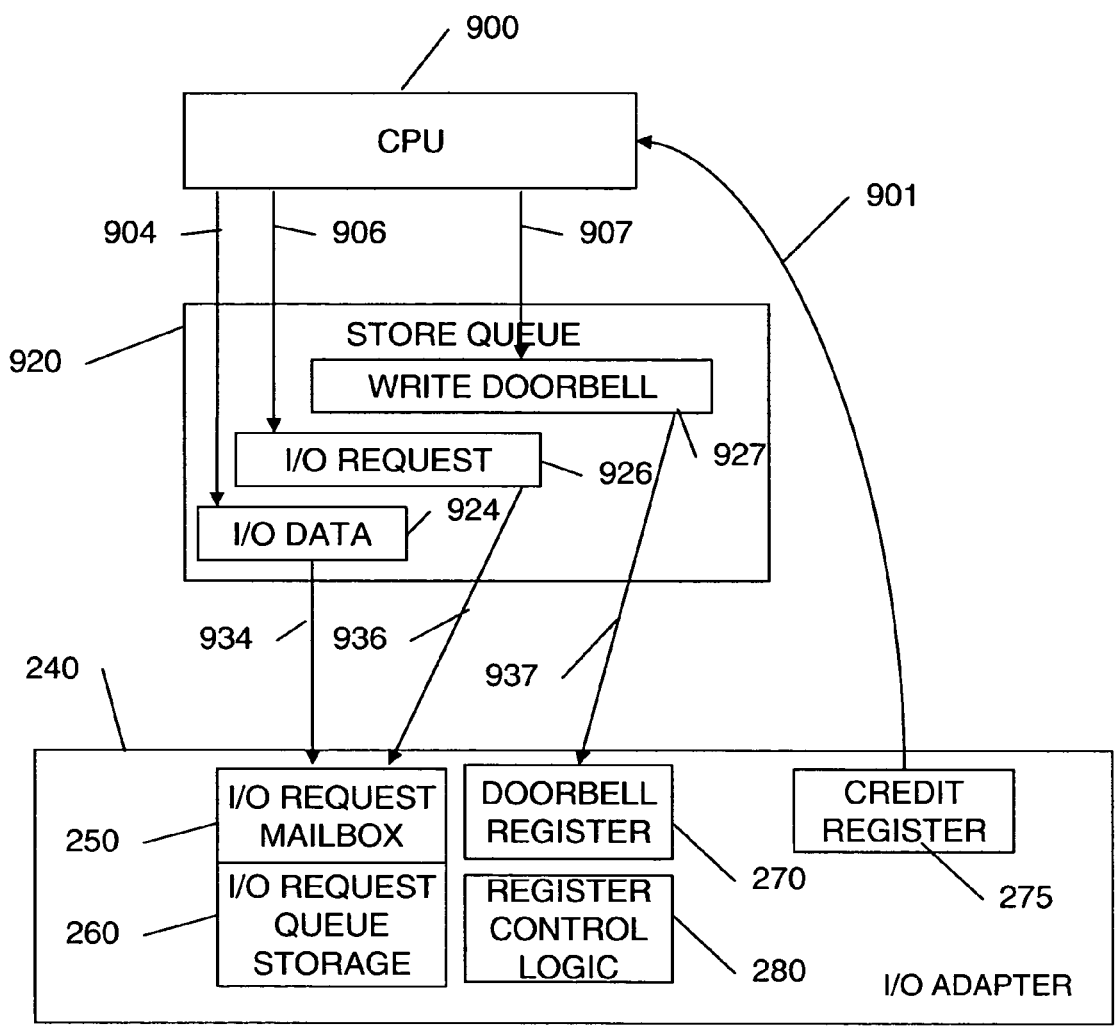
FIG. 10 a block diagram of another embodiment of the invention using a queuing of the I/O requests before a transfer to the I/O adapter is performed.
Figure 11:
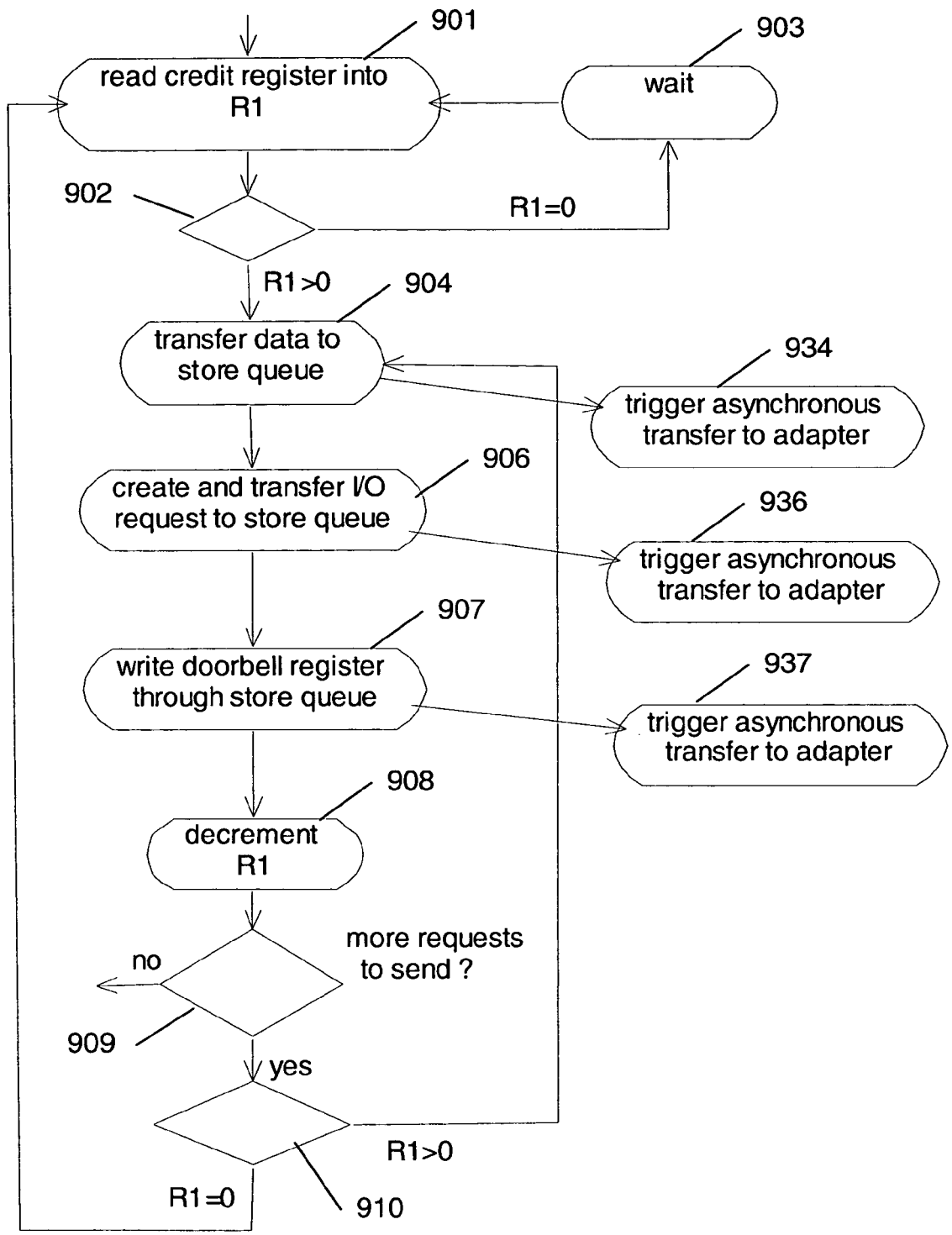
FIG. 11 a flow diagram representing method steps of the operation performed by the embodiment of FIG. 10.

FIGS. 10 and 11 show an alternative embodiment and the method steps of its operation. This embodiment is part of a computer system that comprises a CPU 900 and a store queue 920 for queuing I/O requests and related data before they are transferred to the I/O adapter 240. Also in this embodiment further CPUs or threads or tasks running in such CPUs may be initiators of the I/O requests as will be described below with reference to FIG. 12. The store queue 920 is preferably a first-in-first-out stack which contains a location 926 for storing a plurality of I/O requests received from the CPU 900 via connection 906, and further contains a location 924 for storing the I/O data related to each of said requests and received from the CPU 900 via connection 904. The store queue stack 920 further comprises a write doorbell location 927 which stores for each of the I/O requests received by stack 920, or for each received sequence of a predetermined number of I/O requests, a doorbell write signal that is provided by the CPU via connection 907. The locations 926, 924 of the store queue stack 920 are connected through connections 936 and 934 to the mailbox 250 of I/O adapter 240. The location 927 of the store queue 920 is connected through a connection 937 to doorbell register 270 in the I/O adapter 240. The implementation of I/O adapter 240 corresponds to the I/O adapter 240 as described above with reference to FIG. 2. Accordingly, the connections 934, 936, 937 may be part of the connection network 220 of FIG. 2.

The operation of the store queue 920 will be described with reference to FIG. 11. The CPU 900 starts the operation by step 901 to read the contents of the credit register 275 into register R1. This corresponds to step 601 described above. Step 902 checks register R1 whether its contents is zero indicating that I/O request queue 260 is full. If this is the case a waiting step 903 is entered. If register R1 contains a non-zero the contents, the CPU 900 transfers I/O data to location 924 of the store queue stack 920. This takes place through step 904 which corresponds to an activation of connection 904 in FIG. 10. The CPU 900 further transfers through step 906 an I/O request, to which the I/O data in location 924 is related, to location 926 of the store queue stack 920. In the next step the connection 907 is activated to transfer a doorbell signal to location 927 of the store queue stack 920. Simultaneously with the transfers to the store queue 920 by the steps 904, 908 and 907, steps 934, 936 and 937 are activated which trigger asynchronous transfers to the I/O adapter. Steps 934 and 936 start a transfer of I/O data from location 924 and of I/O requests from location 926 to the I/O mailbox 250 of the I/O adapter 240. Step 937 relates to a transfer of the contents of register 927 to the doorbell register 270 of the I/O adapter. These transfer operations are performed asynchronously with the operation of the CPU 900 and further transfer operations according to steps 904, 906 and 907. Actual transfers of the I/O request and the related data to the I/O adapter 240 and their processing is performed in the same manner as described above with reference to FIGS. 2-7. The same applies to transfer of the doorbell signal to the I/O adapter 240 and its processing by the I/O adapter 240. Referring back to FIG. 11, step 908 decrements register R1 and step 909 checks whether there are more requests to be sent. If this is not the case, the operation is terminated. Otherwise step 910 checks again the content of register R1 and steps 904-909 are repeated except the contents of register R1 is zero in which case step 901 is repeated. It can be seen that the transfer operations to the store queue 920 are performed independently of the processing of I/O requests in the I/O adapter and that waiting times of the CPU 900 for pending transfers to the I/O adapter are reduced or avoided.

The embodiment of FIGS. 10 and 11 may also be used for the handling of I/O requests having associated data which are too large for being stored in location 211 of the store queue stack 920. In such cases the location 924 contains instead of I/O data a list of main memory addresses of the data to which the I/O request is related. The operation of the queue stack 920 in handling these I/O requests corresponds to the operation described with reference to FIG. 11 while the processing of these requests in the I/O adapter 240 corresponds to the long enqueueing operations described with reference to FIGS. 8 and 9.

Figure 12:
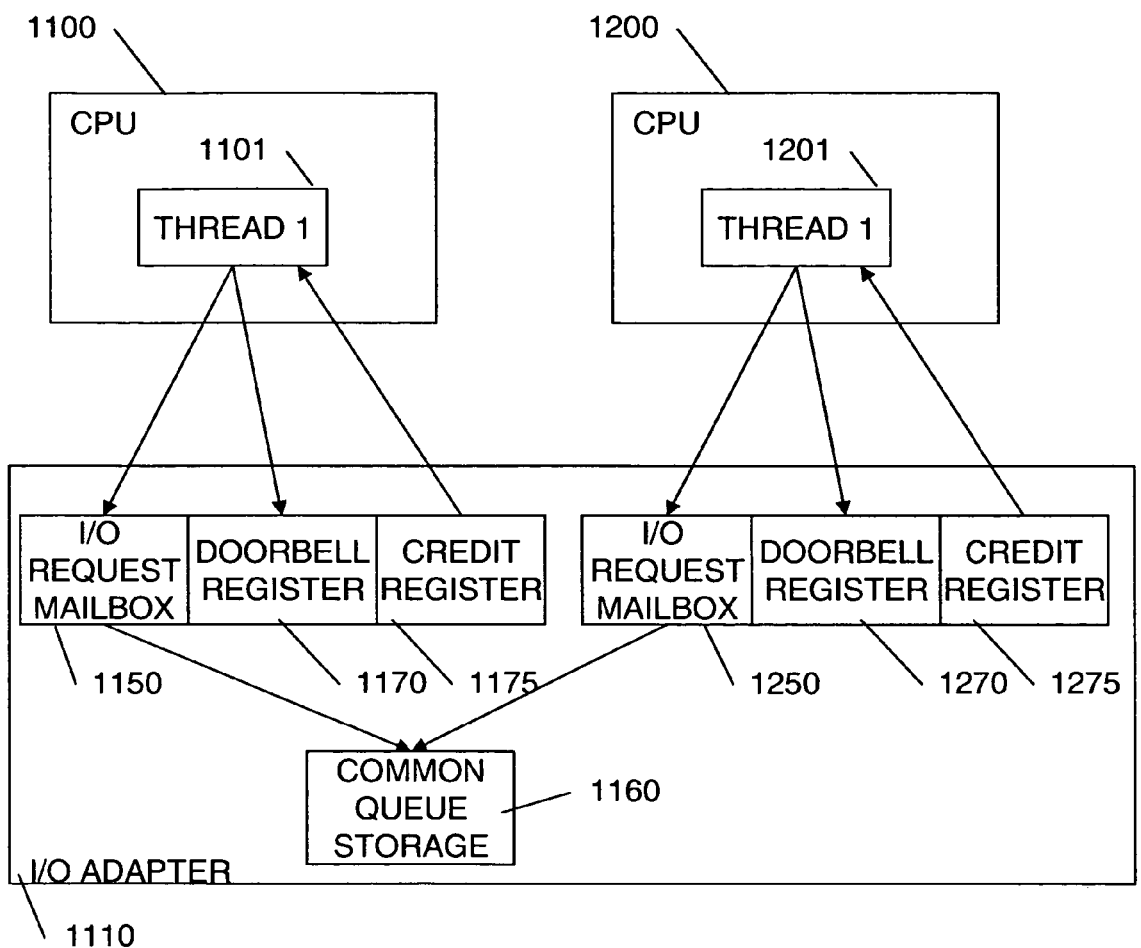
FIG. 12 a block diagram of a computer system comprising another embodiment of the invention using parallel initiators of I/O requests.

FIG. 12 shows a generalized block diagram of a computer system comprising parallel initiators for the enqueueing of I/O requests wherein each initiator have its own set of mailbox, doorbell and credit register. The system of FIG. 12 comprises CPU 1100 and CPU 1200 each working in a multiprogramming mode using in a conventional manner multiple program threads including threads 1101 and 1201. An I/O adapter 810 is connected to both of the CPUs 1100 and 1200 and comprises two I/O request mailboxes 1150 and 1250 each having its own doorbell register 1170 and 1270 and credit register 1175 and 1275, respectively. The I/O adapter 1110 also comprises a queue storage 1160 which is shared by both I/O request mailboxes 1150 and 1250. The threads 1101 and 1201 are initiators for I/O requests which are performed by the components 1150, 1170, 1175 and 1250, 1270, 1275 in the manner described with reference to FIGS. 3-11. The I/O adapter 1110 does the multiplexing and scheduling of the I/O requests received by the mailboxes 1150 and 1250. For this purpose, the common queue storage 1160 may be a first-in-first-out storage. Alternatively, more sophisticated scheduling algorithms can be applied.

While the invention is disclosed with reference to the described embodiments, modifications or other implementations of the invention are within the scope of the invention as defined in the claims.

What is claimed is:

1. An apparatus for operating an I/O adapter in a computer system comprising at least one central processing unit (CPU) having a cache memory, wherein the CPU and the I/O adapter are connected through a connection network to a main memory containing program instructions and data, the I/O adapter receives I/O requests from the CPU and comprises doorbell register controlled by the CPU to allow the I/O adapter access to the main memory for performing read or write operations, the I/O adapter comprising:

at least one I/O request mailbox for receiving I/O requests and data from the CPU;
   at least one I/O request queue storage, the I/O request storage connected to the I/O request mailbox, the I/O request storage storing a plurality of I/O requests and related data received by the I/O request mailbox;
   a credit register which, the credit register connected to the I/O request mailbox, the credit register storing a filling state of the I/O request queue storage; and
   wherein the connection network is designed and operated to:
   (a) transfer the contents of the credit register to the CPU for performing a check of the filling state of the I/O request queue storage,
   (b) transfer an I/O request and related data to a selected I/O request mailbox of the I/O adapter, and
   (c) activate the doorbell register for signalling to the I/O adapter to process the I/O request including access to the main memory by the I/O adapter if required.

2. The apparatus according to claim 1, wherein the I/O adapter comprises an I/O request mailbox for each initiator of an I/O request, each I/O request mailbox having an associated credit register and doorbell register.

3. The apparatus according to claim 1, wherein the I/O request further comprises a request identifier (CMND ID) for identifying the request in the I/O request queue storage.

4. The apparatus according to claim 1, further comprising a sequence of I/O requests created by an initiator wherein any one of each I/O request of the sequence or a predetermined number of I/O requests of the sequence, is followed by a doorbell register activating signal.

5. The apparatus according to claim 1, further comprising a store queue apparatus containing storage locations for queuing I/O requests and related data or addresses of related data and related door bell signals received from any one of a CPU initiator or another initiator; and comprising triggering apparatus for triggering asynchronous transfers of queued I/O requests and any one of related data or addresses of related data, the triggering apparatus further triggering related door bell signals to the I/O adapter.

6. The method according to claim 1, further comprising the steps of:
   (a) storing in any one of the cache memory of the CPU or the main memory the filling state of an I/O request queue storage associated with the CPU;
   (b) creating in any one of the cache memory of the CPU or the main memory the data to be processed by the I/O adapter;
   (c) creating in any one of the cache memory of the CPU or the main memory an I/O request;
   (d) selecting a free location in the I/O request queue storage by checking the filling state stored in any one of the cache memory of the CPU or the main memory; and
   (e) transferring the I/O request and the related data from any one of the cache memory of the CPU or the main memory to the I/O request mailbox and enqueueing the request into the selected free location of the I/O request queue storage
   (f) transferring an activating signal to the doorbell register, the activating signal signalling the I/O adapter to process the I/O request, wherein the process of the I/O request comprises accessing any one of the cache memory of the CPU or the main memory by the I/O adapter when required.

7. The method according to claim 6, wherein two or more I/O requests and related data are created in any one of the cache memory of the CPU or the main memory and wherein the steps (d)(f) are repeated for each of the two or more I/O requests.

8. The method according to claim 6, wherein an I/O request further comprises a pointer address of the data created in step (b).

9. The method according to claim 6, wherein the data created in step (b) are locked against modification until the processing of the I/O request is completed.

10. A method for operating an I/O adapter in a computer system comprising at least one central processing unit (CPU) having a cache memory, the CPU and the I/O adapter are connected through a connection network to a main memory containing program instructions and data, the I/O adapter receives I/O requests from the CPU and comprises a doorbell register controlled by the CPU to allow the I/O adapter access to the main memory for performing read or write operations, the method comprising the steps of:
    receiving I/O requests comprising a first I/O request;
    storing the first I/O request in a first I/O request mailbox, the I/O request mailbox for holding received I/O requests and data;
    forwarding the first I/O request from the I/O request mailbox to an I/O request queue storage, the I/O request queue storage for storing a plurality of I/O requests and related data received by the mailbox;
    storing in a credit register the filling state of the I/O request queue storage;
    transferring the contents of the credit register to the CPU for enabling the CPU to check the filling state of the I/O request queue storage; and
    receiving an activating signal at the doorbell register, the activating signal signalling the I/O adapter to process the first I/O request, wherein the process of the first I/O request comprises accessing any one of the cache memory of the CPU or the main memory by the I/O adapter when required.

11. The method according to claim 6, wherein step (e) of transferring the I/O request and any one of the related data or addresses is performed such that the transfer takes place to an I/O request mailbox which is fixedly assigned to the initiator of the request.

12. The method according to claim 11, wherein the I/O request mailboxes share a common I/O request queue storage.

13. The method according to claim 11, wherein the assigned I/O request mailbox is connected to its own I/O request queue storage.

14. The method according to claim 10, wherein a plurality of I/O request initiators are active further comprising the steps of:
    (a) storing in any one of the cache memory of the CPU or the main memory of an I/O request initiator of the plurality of I/O request initiators the filling state of the I/O request queue storage from a credit register associated with the initiator;
    (b) creating in any one of the cache memory of the CPU or the main memory of each initiator any one of the data or the addresses of data to be processed by the I/O adapter;
    (c) creating in any one of the cache memory of the CPU or the main memory of each initiator an I/O request;
    (d) determining a free location in the I/O request queue storage of an I/O request mailbox associated with the request initiator by checking the data stored in step (a) in any one of the cache memory of the CPU or the main memory of the request initiator;
    (e) transferring the I/O request and any one of the related data or addresses from any one of the cache memory of the CPU or the main memory of each initiator to the I/O request mailbox and enqueueing the request into the I/O request queue storage which is common to the I/O request mailboxes; and
    (f) transferring an activating signal to the doorbell register, the activating signal signalling the doorbell register to process the I/O request, wherein the process of the I/O request comprises accessing any one of the cache memory of the CPU or the main memory by the I/O adapter when required.

15. The method according to claim 10, wherein an initiator of an I/O request is a thread or task running on the central processing unit.

16. The method according to claim 10, wherein the I/O request comprises a request identifier (CMND ID) for identifying the request in the I/O request queue storage.

17. The method according to claim 10 wherein a sequence of I/O requests are created by an initiator, wherein any one of each I/O request of the sequence or a predetermined number of I/O requests of the sequence, is followed by a doorbell register activating signal.

18. The method according to claim 10 further comprising the steps of:
    storing I/O requests and any one of related data or addresses of related data and related door bell signals received from any one of a CPU initiator or another initiator into the I/O request queue storage; and
    asynchronously transferring the stored I/O requests and related door bell signals and any one of related data or addresses of related data to the I/O adapter.

19. The method according to claim 18, wherein the I/O request queue storage operate according to the first-in-first-out principle.

20. A computer program product for operating an I/O adapter in a computer system comprising at least one central processing unit (CPU) having a cache memory, the CPU and the I/O adapter are connected through a connection network to a main memory containing program instructions and data, the I/O adapter receives I/O requests from the CPU and comprises a doorbell register controlled by the CPU to allow the I/O adapter access to the main memory for performing read or write operations, the computer program product comprising:
    a storage medium readable by a processing circuit and storing instructions for execution by a processing circuit for performing a method comprising the steps of:
    receiving I/O requests comprising a first I/O request;
    storing the first I/O request in a first I/O request mailbox, the I/O request mailbox for holding received I/O requests and data;
    forwarding the first I/O request from the I/O request mailbox to an I/O request queue storage, the I/O request queue storage for storing a plurality of I/O requests and related data received by the mailbox;
    storing in a credit register the filling state of the I/O request queue storage;
    transferring the contents of the credit register to the CPU for enabling the CPU to check the filling state of the I/O request queue storage; and
    receiving an activating signal at the doorbell register, the activating signal signalling the I/O adapter to process the first I/O request, wherein the process of the first I/O request comprises accessing any one of the cache memory of the CPU or the main memory by the I/O adapter when required.

* * * * *